(12) United States Patent
Richter

(10) Patent No.: US 10,920,467 B2
(45) Date of Patent: Feb. 16, 2021

(54) SELECTIVELY LOCKABLE BOX AND METHOD OF USE

(71) Applicant: Adrian Steel Company, Adrian, MI (US)

(72) Inventor: Thomas Richter, Sand Creek, MI (US)

(73) Assignee: Adrian Steel Company, Adrian, MI (US)

( * ) Notice: Subject to any disclaimer, the term of this patent is extended or adjusted under 35 U.S.C. 154(b) by 475 days.

(21) Appl. No.: 15/887,985

(22) Filed: Feb. 3, 2018

(65) Prior Publication Data
US 2019/0242164 A1 Aug. 8, 2019

(51) Int. Cl.
| | |
|---|---|
| E05B 65/462 | (2017.01) |
| E05C 9/10 | (2006.01) |
| E05C 9/02 | (2006.01) |
| B25B 5/00 | (2006.01) |
| B25H 3/02 | (2006.01) |
| E05C 9/00 | (2006.01) |
| E05C 9/22 | (2006.01) |
| B60R 9/06 | (2006.01) |

(52) U.S. Cl.
CPC ............ E05C 9/026 (2013.01); B25B 5/00 (2013.01); B25H 3/028 (2013.01); E05C 9/006 (2013.01); E05C 9/10 (2013.01); E05C 9/22 (2013.01); B25H 3/02 (2013.01); B60R 9/065 (2013.01); E05Y 2900/208 (2013.01); E05Y 2900/602 (2013.01); Y10S 292/68 (2013.01); Y10T 292/1025 (2015.04)

(58) Field of Classification Search
CPC ............ Y10S 292/68; Y10T 292/1025; Y10T 292/1028; E05C 9/02; E05C 9/026; E05C 9/006; E05C 9/10; E05C 9/22

USPC ......................................... 312/215, 216, 222
See application file for complete search history.

(56) References Cited

U.S. PATENT DOCUMENTS

| | | | | |
|---|---|---|---|---|
| 939,174 A | * | 11/1909 | Schlapbach | E05B 63/128 292/150 |
| 950,813 A | * | 3/1910 | Bodenstein | E05B 65/0003 312/222 |
| 1,015,338 A | * | 1/1912 | Peel | E05B 65/0864 292/57 |
| 1,075,652 A | * | 10/1913 | Kleber | A47B 63/02 312/304 |
| 1,613,732 A | * | 1/1927 | Stockov | E05B 65/467 312/216 |
| 1,625,145 A | * | 4/1927 | O'Connor | E05B 65/025 292/188 |
| 1,714,923 A | * | 5/1929 | Roaten | E05B 83/24 292/164 |
| 2,078,572 A | * | 4/1937 | Jacob | E05D 13/06 292/68 |

(Continued)

FOREIGN PATENT DOCUMENTS

| | | | | | |
|---|---|---|---|---|---|
| FR | 809075 A | * | 2/1937 | ............... | E05C 9/02 |
| FR | 952964 A | * | 11/1949 | ............... | E05C 9/02 |

*Primary Examiner* — Carlos Lugo
(74) *Attorney, Agent, or Firm* — Marshall & Melhorn, LLC

(57) ABSTRACT

A selectively lockable box may have a locking structure that may have a first bar, a second bar and a lock housing. The first and second bar engage with one another, and the lock, to lock the box. The first bar may be horizontally oriented to lock a box lid, and the second bar may be a vertically oriented to lock other access areas of the box.

11 Claims, 8 Drawing Sheets

(56) References Cited

U.S. PATENT DOCUMENTS

| | | | | |
|---|---|---|---|---|
| 2,810,616 A * | 10/1957 | McClellan | E05B 65/46 | 312/218 |
| 2,913,296 A * | 11/1959 | Martin | E05B 65/467 | 312/216 |
| 4,288,134 A * | 9/1981 | Knaack | A47B 81/00 | 312/100 |
| 4,491,354 A * | 1/1985 | Williams | E05C 19/003 | 292/148 |
| 4,565,078 A * | 1/1986 | Solomon | E05B 65/0864 | 292/150 |
| 5,092,637 A * | 3/1992 | Miller | E05B 17/0037 | 292/150 |
| 5,104,163 A * | 4/1992 | Palmer, Jr. | E05B 63/24 | 292/148 |
| 5,421,074 A * | 6/1995 | Moore | E05B 13/002 | 29/401.1 |
| 5,915,802 A * | 6/1999 | Siler | E05B 65/467 | 109/47 |
| 6,772,613 B2 * | 8/2004 | Webb | B25H 3/02 | 292/148 |
| 7,418,846 B2 * | 9/2008 | James | B25H 3/02 | 292/148 |
| 8,342,580 B2 * | 1/2013 | Cowie | B65D 19/08 | 292/104 |
| 8,360,485 B2 * | 1/2013 | Ma | H05K 5/0221 | 292/137 |
| 9,164,549 B2 * | 10/2015 | Liu | G06F 1/1656 | |
| 9,663,278 B1 * | 5/2017 | Daws, II | E05B 63/244 | |
| 2003/0102784 A1 * | 6/2003 | Friar | B62B 5/0013 | 312/218 |
| 2004/0232092 A1 * | 11/2004 | Cash | A47F 3/002 | 211/4 |
| 2006/0207182 A1 * | 9/2006 | Van Parys | E05D 15/5208 | 49/192 |

* cited by examiner

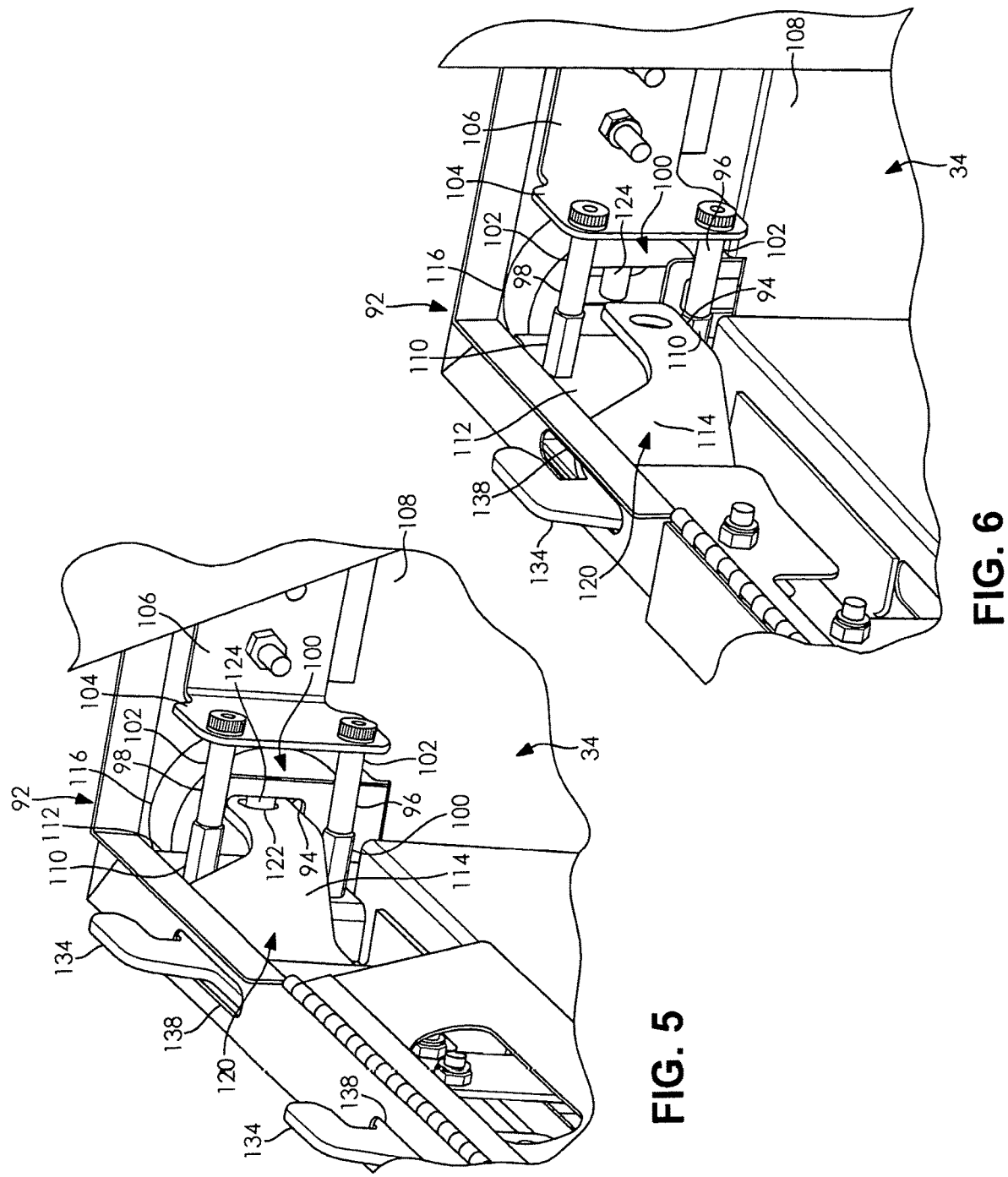

SELECTIVELY LOCKABLE BOX AND METHOD OF USE

BACKGROUND

In some cases, it is desirable to lock a container so that the contents of the container cannot be removed by unauthorized persons. Locks, such as padlocks, are typically attached to containers to provide some degree of security. Often, however, if the value of the contents of the container are high enough, and/or if the motivation of the person is high enough, a mere padlock on the outside of the container will not be enough to prevent the person from accessing the container.

Containers have been provided with other locking structures to thwart would be thieves, but often the structures are cumbersome to work with, add too much weight to the container, add too much expense to the container and/or still are not effective.

It would be advantageous for a container, such as a box, for example a tool box, to have a locking mechanism for selectively locking the container that was effective, lightweight and inexpensive.

SUMMARY

In one embodiment, a selectively lockable box is provided with a horizontally oriented bar having a first end portion and a body portion. The first end portion may have an aperture therethrough and the body portion has a plurality of locking teeth extending therefrom. A vertically oriented bar may also be provided having a first end portion and a body portion. The first end portion has an aperture therethrough. A lock housing may also be provided having a lock behind two separated bars defining an passage between them. The first end portion of the vertically oriented bar is selectively located between the bars and the lock. The first end portion of the horizontally oriented bar is selectively located through the bar aperture, through the aperture of the vertically oriented bar and into the lock.

DESCRIPTION OF THE FIGURES

Reference will now be made, by way of example, to the accompanying drawings which show example embodiments of the present application, and in which:

FIG. 5 schematically depicts an interior perspective view of some of the locking members in a locked condition;

FIG. 6 schematically depicts an interior perspective view some of the locking members in an unlocked condition;

DESCRIPTION OF THE EXEMPLARY EMBODIMENTS

It is to be understood that the device and method described herein may assume various alternative orientations and step sequences, except where expressly specified to the contrary. It is also to be understood that the specific devices and processes illustrated in the attached drawings, and described in the following specification are simply exemplary embodiments of the concepts defined in the appended claims. Hence, specific dimensions, directions or other physical characteristics relating to the embodiments disclosed are not to be considered as limiting, unless the claims expressly state otherwise.

Figures 1, 2:
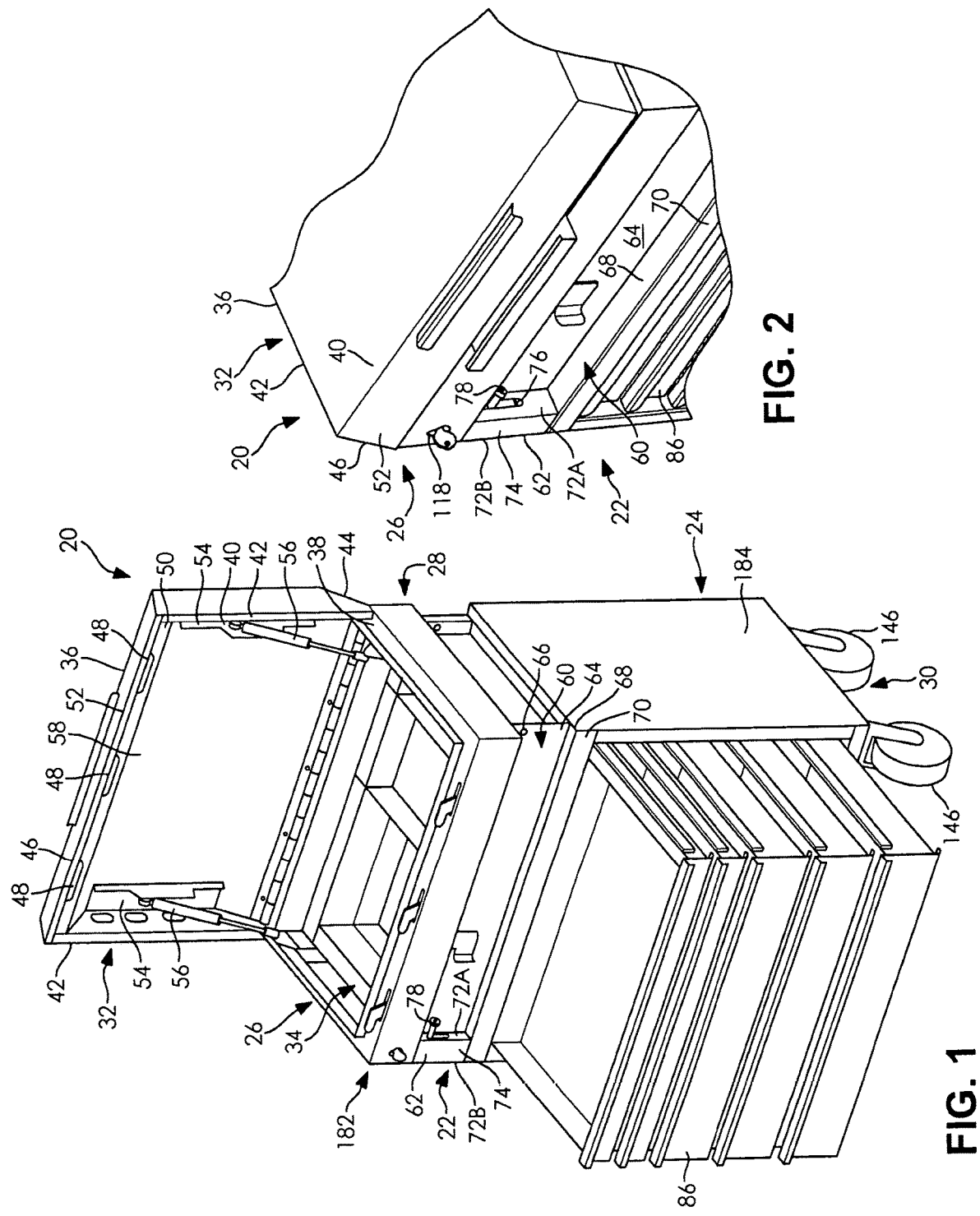
FIG. 1 schematically depicts a front perspective view of one embodiment of a selectively lockable box.
FIG. 2 schematically depicts a front perspective view of a portion of the box of FIG. 1 with the lid in a closed orientation.

Turning now to FIG. 1, one embodiment of a selectively lockable box 10 is depicted. In the depicted embodiment, the box 10 has four sides, however, the box 10 may have any number of three or more sides.

The sides may be such as a front side 22, rear side 24, a first side 26 and a second side 28. The sides 22, 24, 26, 28 are connected together. The sides 22, 24, 26, 28 may be comprised of the same piece or they may be comprised of a plurality of pieces. In any case, the sides 22, 24, 26, 28 are preferably connected together in a substantially continuous manner such that there are no openings.

The box 20 preferably also has a bottom 30 and a top 32. The box 20 defines a hollow interior portion 34 which may be used to house or enclose items (not shown).

The top 32 may be comprised of a selectively openable lid, as can be appreciated from FIGS. 1 and 2. The lid 36 may be openable by being connected (permanently or temporarily) to the box 20, or the lid 36 may be entirely removable from the box 20. In the depicted embodiment in FIG. 1, the lid 36 is hinged to the box 20. More particularly, the lid 36 is hinged to the rear side 24 (comprised of a rear wall) of the box 20 with a plurality of hinges 38.

As shown in FIGS. 1 and 2, the lid 36 may be used to selectively enclose the box 20. More particularly, the lid 36 may extend from each of the sides 22, 24, 26, 28 to enclose them. In one embodiment, the lid 36 may have a substantially planar upper surface 40 and a plurality of sides 42 that extend downwardly from the upper surface 40. As shown in FIG. 2, the sides 42 are equally angled downwardly from the upper surface 40. In the depicted embodiment, there are four sides 42 that angle downwardly from the upper surface 40. The downwardly angled sides 42 provide the lid 36 with an internal volume, which is useful for accommodating mechanical structures of the box 20, or contents of the box 20. A rear side 44 of the lid 36 is connected to the plurality of hinges 38 on the rear side 24.

A front side 46 of the lid 36 is preferably provided with at least one slot 48. More particularly, a bottom surface 50 of the front side 46 of the lid 36 is provided with the slot 48. The slot 48 extends parallel but is axially offset from an outer surface 52 of the front side 46 of the lid 36. In the embodiment depicted in FIG. 1, there are three slots 48, each of approximately the same shape, length and width as one another. The slots 48 may be equally or unequally spaced from one another. The slots 48 on the front side 46 extend substantially parallel the plurality of hinges 38 on the rear side 44. Preferably, the slots 48 are coaxial with one another. The slots 48 may be as deep as the angled sides 42 of the lid 36, but depths of less dimension will work as well.

Anchor points 54 for biasing members. 56 may be attached to an inside surface 58 of the upper surface 40, or one of the sides 42, of the lid 36. The anchor points 54 may be used to connect biasing members 56, such as one or more pneumatic pistons to the lid 36. The biasing members 56 are also connected to at least one of the sides 26, 28 of the box 20. The biasing members 56 provide selective assistance to a user in raising and/or lowering the lid 36. The biasing members 56 may also provide a soft closure operation for the lid 36 so that it does not fall onto the box 20.

The front side 22 may be seen in FIGS. 1-4. The front side 22 is comprised of a plurality of structures. One of the structures is an operator's box 60. The operator's box 60 is an open faced box (the front is open) with a lever housing 62, a back plate 64, an upper plate 66 and a lower plate 68.

The lower plate 68 may be comprised of a rectangular bar, or portion, that extends the length of the box 60. The lower plate 68 has a predetermined width.

The back plate 64 extends above the lower plate 68 for substantially the length of the lower plate 68. The back plate 64 extends upwardly from the lower plate 68 in a transverse manner. The back plate 64 is offset from a front surface 70 of the lower plate 68. The front surface 70 is parallel but nonplanar with the back plate 64.

The lever housing 62 extends upwardly transverse from the lower plate 68 and on one side of the back plate 64. The lever housing 62 extends substantially along the entire height of the back plate 64.

The lever housing 62 has two opposing sidewalls 72 and a front face 74. Preferably, the sidewall 72 adjacent the back plate 64 and the lower plate 68 has a slot, or groove 76, extending at least partially the height of the lever housing 62. This will be designated the first sidewall 72A.

A portion of a lever 78 extends through the slot 76 in the first sidewall 72A. The lever 78 may be such as a rod, tube or other cylindrical object, but other shapes are permissible. The portion of the lever 78 that extends through the slot 76 into the operator's box 60 is designed to be sufficient to be grasped by a user. The lever 78 may be selectively raised and lowered within the slot 76.

Figure 4A:
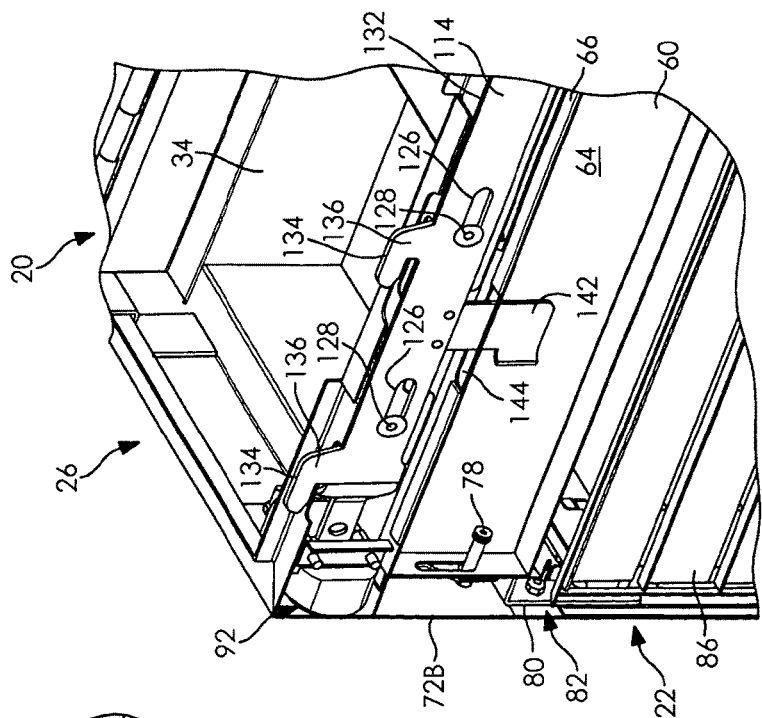
FIG. 4A schematically depicts a cutaway perspective front view of some of the locking members of FIG. 3 in an unlocked condition.
Figure 3:
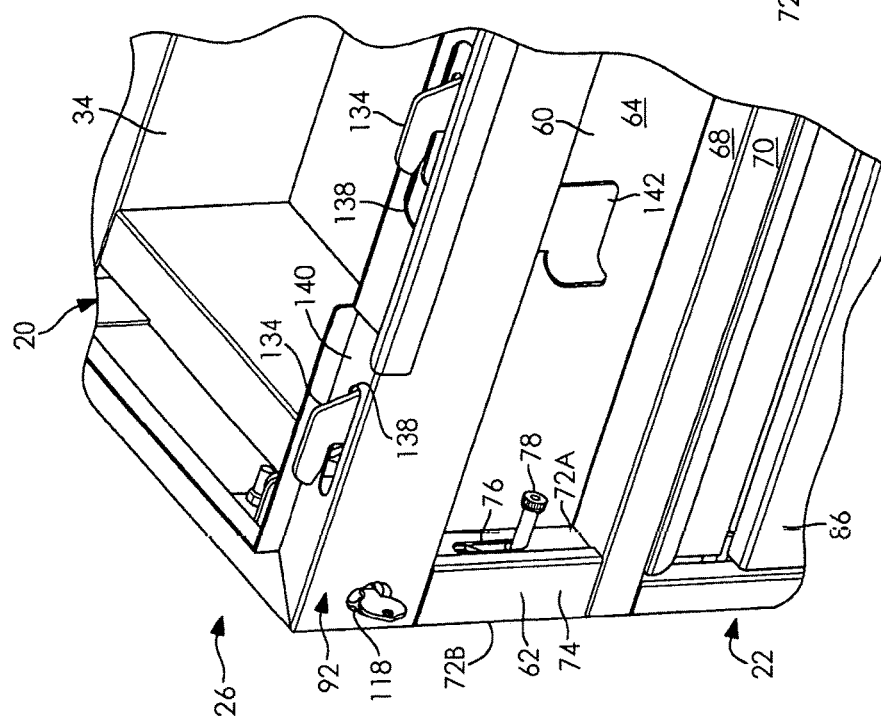
FIG. 3 schematically depicts a partial front perspective view of the box of FIG. 1 with the lid in an open orientation depicting some of the locking members.
Figure 4C:
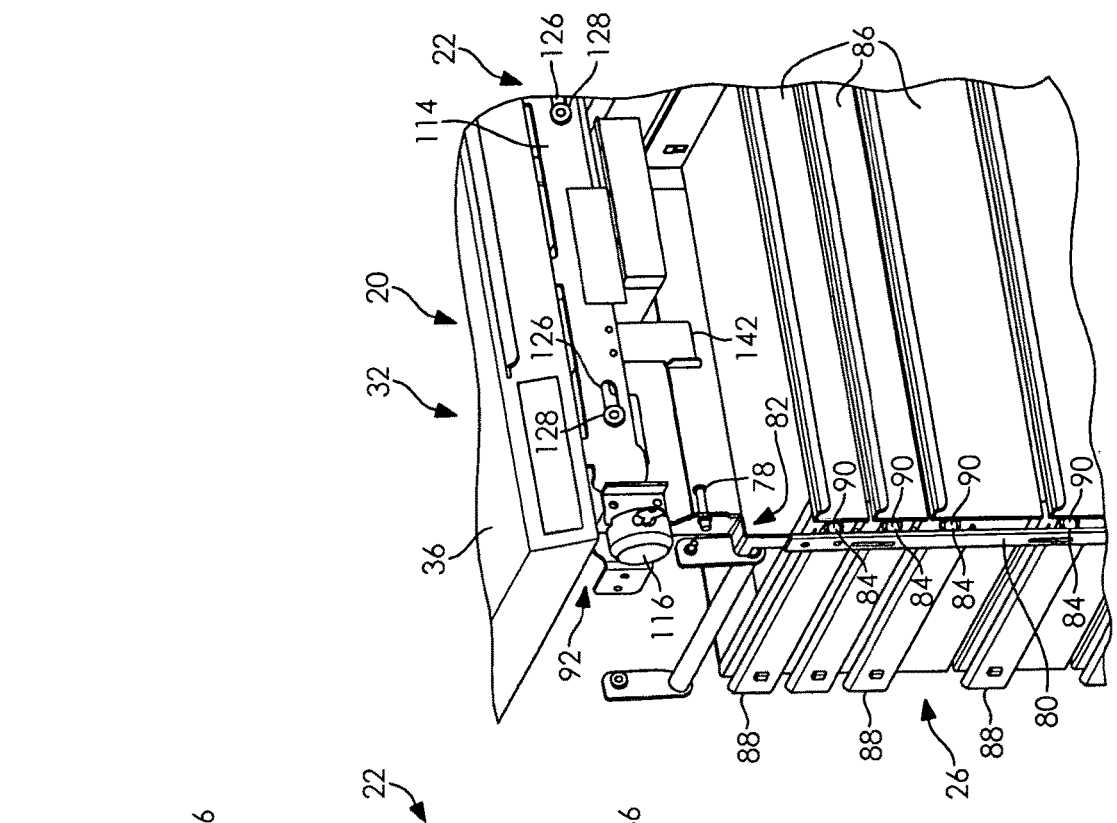
FIG. 4C schematically depicts another cutaway perspective front view of some of the locking members in an unlocked condition.
Figure 4B:
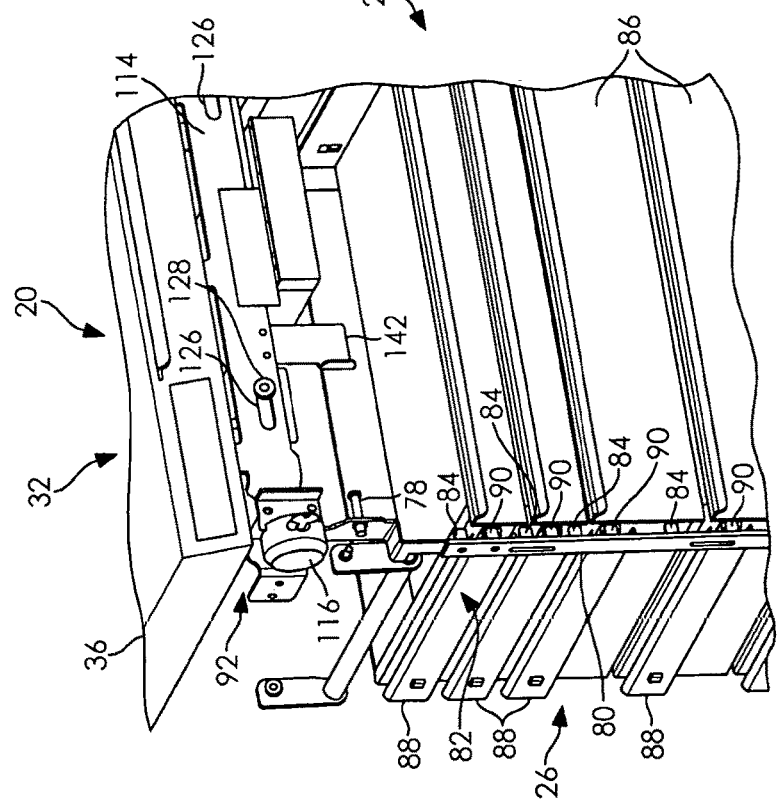
FIG. 4B schematically depicts another cutaway perspective front view of some of the locking members in a locked condition.

The opposite end of the lever 78 is securely attached to a selectively vertically slidable lock bar 80, as shown in FIGS. 4A-4C. The lever 78 is attached to an upper end portion 82 of the vertical lock bar 80. The lock bar 80 is vertically slidable at least adjacent the first side 26 of the box 20, and it is substantially parallel, but axially offset, from the first side 26.

The lock bar 80 may be comprised of a single piece or it may be comprised of a plurality of pieces, the latter case is in the depicted embodiment. On more pins 84 may be fixed to the lock bar 80. In the depicted embodiment, at least one pin 84 extends inwardly transverse from the lock bar 80.

The lock bar 80 preferably extends down one of the sides 26, or 28 of the box 20. If the box 20 has drawers 86, such as in the depicted embodiment, the drawers 86 may have drawer slides 88. The drawer slides 88 comprise one piece mounted to the box side 26 and/or 28 and one piece mounted to the drawer 86. The glide pieces move relative to one another to permit the drawer 86 to be pulled/pushed from/into the box 20.

When the lever 78, and thus the lock bar 80, are in the lowered, or locked position, as shown in FIG. 4B, the pins 84 on the lock bar 80 are positioned in front of the drawer slide 90 mounted to the drawer 86. In other words, the pin 84 blocks any forward movement of the glide 88, and thus the drawer 86.

When the lever 78, and thus the lock bar 80, are in the raised, or unlocked position, as shown in FIG. 4C, the pins 84 on the lock bar 80 are moved out of position of the drawer glide 90 mounted to the drawer 86. Thus, the pins 84 do not block any forward movement of the glide 90 or the drawer 86, permitting it to be moved from the box 20.

The lock bar 80 also extends above the lever 78. As shown in FIG. 5, the lock bar 80 selectively extends into a lock housing 92. More particularly, the upper portion 82 of the lock bar 80 has an aperture 94 therethrough selectively extends into the lock housing 92. The upper portion 82 of the lock bar 80 with the aperture 94 is located above the back plate 64.

The lock housing 92 may be comprised of multiple pieces of robust material, such as steel. The metal pieces may be comprised of at least two fixed bars 96, 98. The bars 96, 98 may be parallel one another and separated by a vertical gap 100. In other words, a first bar 96 is located directly below the second bar 98. The two bars 96, 98 may be identical in size and shape.

Each bar 96, 98 has a first end 102 that extends through and connects with a flange 104 of a bar mount 106 that is attached to an inside side 108 of the box 20. The bar mount 106 extends transverse the box sidewall 26 and transverse the bars 96, 98. Each bar 96, 98 has a second end 110 that extends through a plate 112 located above the lever housing first side wall 72A. The bars 96, 98 are located within the interior portion 34 of the box 20. The vertical gap 100 between the bars 96, 98 accommodates a horizontal lock bar 114.

The bars 96, 98 may be oriented substantially transverse the back plate 64. The bars 96, 98 may be transverse the upper portion 82 of the lock bar 80 when the lock bar is located in the lock housing 92.

A lock 116, such as a pad lock or a puck lock, is located in the lock housing 92. A keyway 118 for the lock 116 may be provided through the box 20 so that the lock 116 can be accessed.

As seen in FIGS. 5 and 6, the lock 116 may selectively retain a portion of the horizontal lock bar 114. More particularly, an end portion 120 of the horizontal lock bar 111 has an aperture 122 therethrough. The shackle 124 of the lock 116 may be selectively located through the aperture 122 to prevent it from horizontal movement. The shackle 124 is co-planar with the major length of the horizontal lock bar 114 but the two are oriented transverse one another.

From FIGS. 5 and 6, it can be appreciated that the horizontal lock bar 114 can be selectively captured within the aperture 94 of the vertical lock bar 80. More particularly, the end portion 120 of the horizontal lock bar 114 extends axially through the gap 100 defined by the bars 96, 98 and the aperture 94 of the vertical lock bar 80 so that the shackle 124 of the lock 116 can selectively extend through the aperture 122 of the horizontal lock bar 120. This has the effect of preventing vertical movement of the vertical lock bar 80 and horizontal movement of the horizontal lock bar 114. By locating the connection among the end portion 120 of the horizontal lock bar 114, the end portion 82 of the vertical lock bar 80 and the shackle 124 with the interior portion 34 of the box 20, the connection is fully enclosed within the box 20 thus making it highly tamper resistant. More particularly, the connection is bounded and directly enclosed at least by the lid 36, the front side 22 and the first side 26.

The horizontal lock bar 114 extends substantially above and along the back plate 64; the lock bar 114 may be parallel but nonplanar with the back plate 64. As can be appreciated from the above, the horizontal lock bar 114 selectively slides in the horizontal, or axial, direction with respect to the box 20. The horizontal lock bar 114 may have apertures 126 that receive pins, rollers and/or bearings 128 to facilitate its horizontal movement. As shown in FIG. 4, the lock bar 114 has two apertures 126 that receive rollers 128 therein.

The upper surface, or upper edge 132, of the horizontal lock bar 114 is provided with a least one locking tooth 134. A connector portion 136 of the locking tooth 134, as well as the rest of the tooth 134, may be one piece with the lock bar 114 or separate. As shown in FIG. 4, the locking tooth 134 is one piece with the lock bar 114 and extends in a parallel and co-planar, but vertically offset, fashion with the lock bar 114. Preferably, there is more than one locking tooth 134 on the lock bar 114, they are aligned with one another and the all move together with the horizontal lock bar 114.

The teeth 134 extend through slots 138 in an upper edge portion 140 of the front side 22, as shown in FIG. 4. As can be appreciated in FIGS. 5 and 6, the teeth 134 may move axially within the slots 138 as the horizontal lock bar 114 is moved between the locked and unlocked position.

The at least one locking tooth 134 selectively engages with the slots 48 in the lid 36 when the lid 36 is closed on the box 20. For example, the locking tooth 134 may be located within a slot 48 and then the locking bar/locking tooth 134 may be horizontally shifted so that the locking tooth 134 contacts, or engages with, the front side bottom surface 50 of the lid 36. In other words, via the slot 48, the tooth 134 selectively overlaps the front side bottom surface 50. In that position, the locking tooth 134 prevents the lid 36 from being raised, thus locking it in place in the down, or closed, position. It can be appreciated that the teeth 134 are fully enclosed by the box 20 and lid 36 when the lid 36 is in the lowered position. This makes the box 20 and the above-described locking mechanism more tamper proof.

The horizontal locking bar 114 may be selectively shifted, or moved, by a handle 142. The handle 142 may be located as shown in FIG. 4 but other locations are permissible. In FIG. 4, the handle 142 extends in a direction transverse the locking bar 114, but it may be co-planar with the locking bar 114. Preferably, the handle 142 extends downwardly from the locking bar 114 and through an aperture 144 in the upper plate 66 and into the operator's box 60. In the operator's box 60 the handle 142, 144 can be grasped by an operator so that the horizontal lock bar 114 can be horizontally shifted in the axial direction, as described above. Thus, the horizontal lock bar 114 can be shifted in one direction with the handle 142 so that the at least one tooth 134 engages the lid 36 to lock it and to also locate the end portion 120 of the horizontal lock bar 114 through the aperture 94 of the vertical lock bar 80 so the horizontal lock bar 114 can be locked in place. The reverse action can be done to unlock the box 20.

The horizontal lock bar 114 and vertical lock bar 80 may be comprised of a flat, sheet-like structure constructed of plate steel. The horizontal lock bar 114 is longer (along its major axis) that it is wide or thick. The vertical lock bar 80 is also longer (taller in its orientation in the box; along its major axis) than it is wide or thick.

Figure 7:
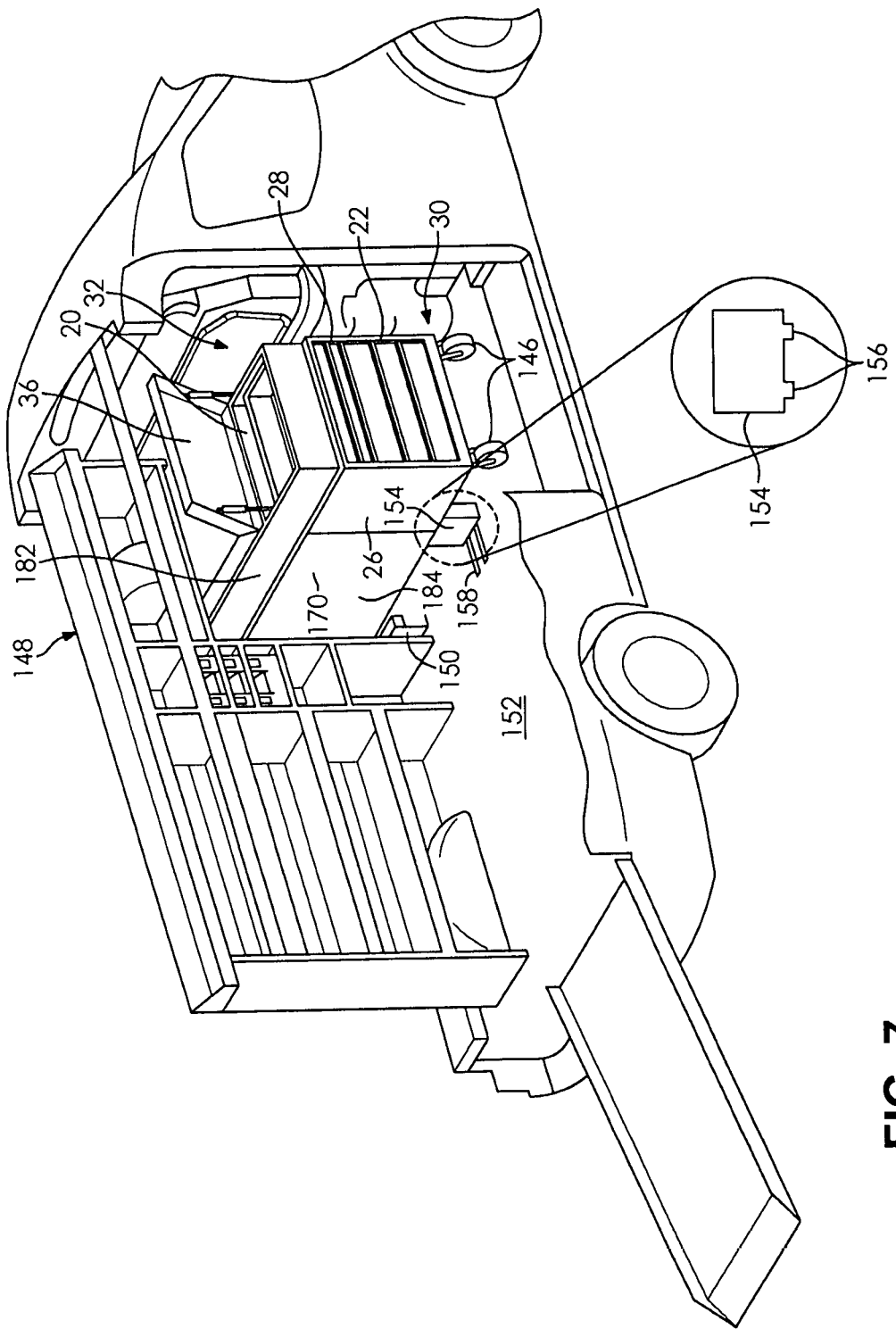
FIG. 7 schematically depicts a partial cross-section perspective view of one embodiment of a working vehicle with a box and an accessory box in one location in the vehicle.

Preferably, the box 20 is designed to be selectively moved from one location to another. Wheels 146, such as four caster wheels, may be located on the bottom 30 of the box 20. The box 20 may also be selectively located in a vehicle 148, as shown in FIG. 7. FIG. 7 schematically depicts one type of vehicle 148 and the box 20 located in one area of the vehicle 148 but other vehicles and other spots or locations within the vehicle are permissible.

The box 20 may be stowed, or secured within, the vehicle 148 such as with one or more brackets. At least one bracket may be a C-shaped bracket 150 that is fixed to a floor 152 of the vehicle 148. One of the caster wheels 146 on one side 26, 28 of the box 20 is located within the C-shaped bracket 150. Preferably, another caster wheel 146 on another side 26, 28 of the box 20 is located within another C-shaped bracket 150.

In addition, a retention plate 154 may be selectively fixed to the floor 152 of the vehicle 148. The retention plate 154 may be a substantially planar plate 154. The retention plate 154 may be removable from the vehicle floor 154 so that the box 20 can be pivoted within the vehicle 148 to fit it within the vehicle 148.

Once the box 20 is in a preferred location within the vehicle 148, and the wheels 146 are located within the C-shaped bracket(s) 150, tabs 156 of the retention plate 154 can be located in slots 158 in the floor 152 to secure the plate 154 to the floor 152 and function as a barrier to prevent the box 20 from moving within the vehicle 148.

Figure 8:
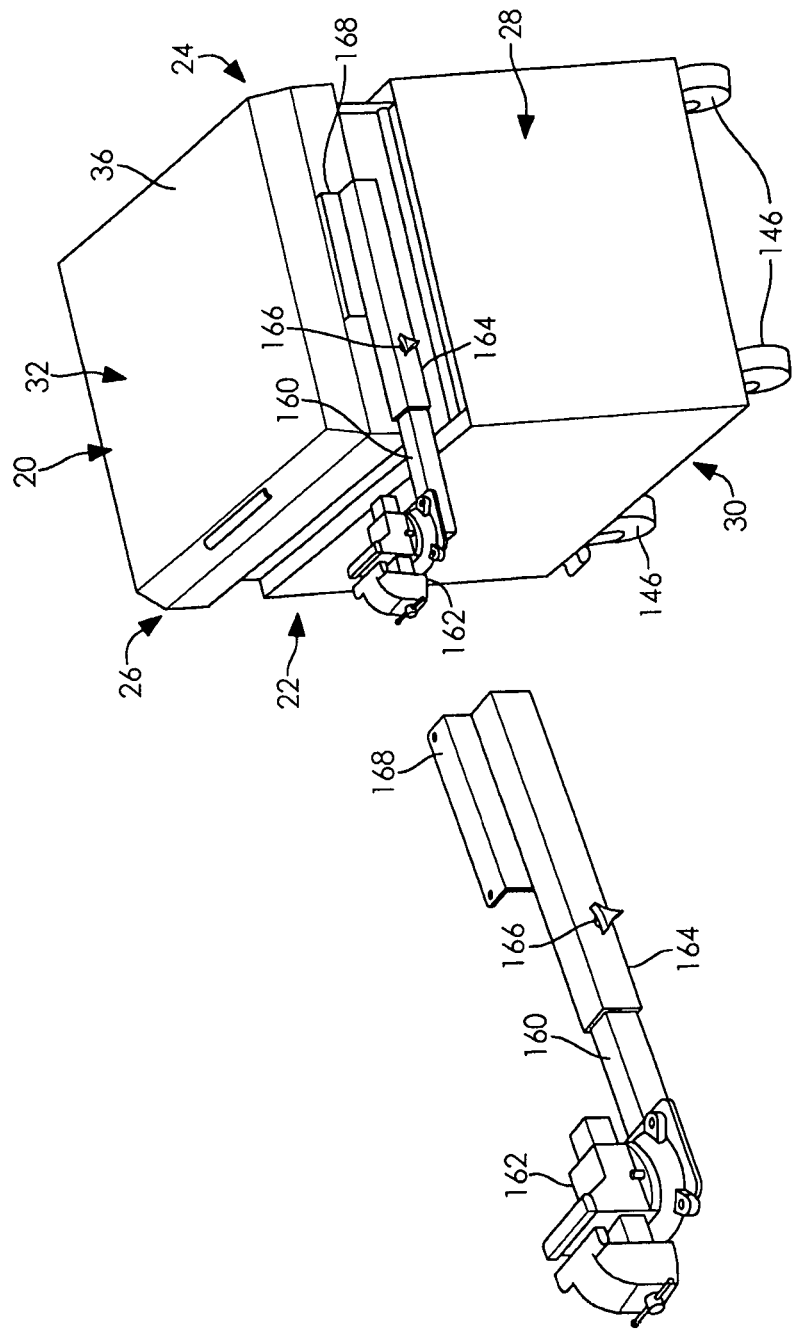
FIG. 8 schematically depicts a perspective view of an accessory that may be selectively used and/or attached to the box.

Additional parts or accessories may be associated with the box 20. By way of one example, a vice mount 160 with a vice 162 may be selectively located on the box 20 as shown in FIG. 8. The vice mount 160 may be comprised of a hollow bar 164 that receives the telescoping vice mount 160 therein. A threaded bolt 166 may selectively extend through the hollow bar 164 and into the vice mount 160 to lock the vice mount 160 in a particular position with respect to the hollow bar 164.

The hollow bar 164 may be connected to a mounting flange 168. The mounting flange 168 may be such as an Z-shaped flange. The upper portion of the mounting flange 168 may be selectively located between the lid 36 of the box 20 and box 20, such as the second side 28 of the box 20. When the lid 36 is closed on the flange 168, the flange 168 is securely fixed in position so that workpieces may be located in the vice 162. It is also permissible for the upper portion of the mounting flange 168 to have pegs, or peg holes, that selectively engage with pegs holes or pegs in the box. The vice mount 160 and vice 162 may be located within the box 20 when it is not in use.

Figure 9:
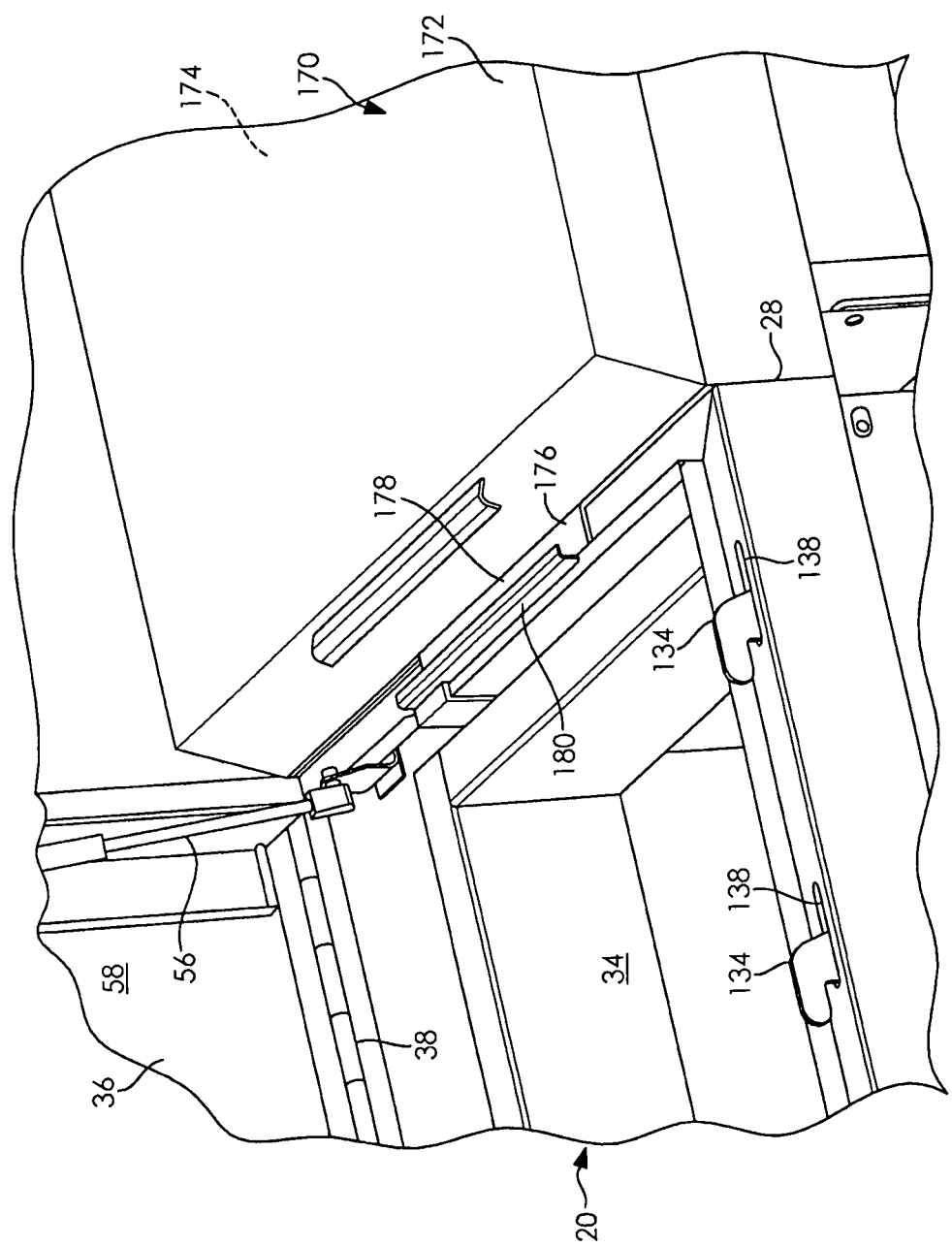
FIG. 9 schematically depicts a partial front perspective view of features for selectively joining the box and accessory box.
Figure 10:
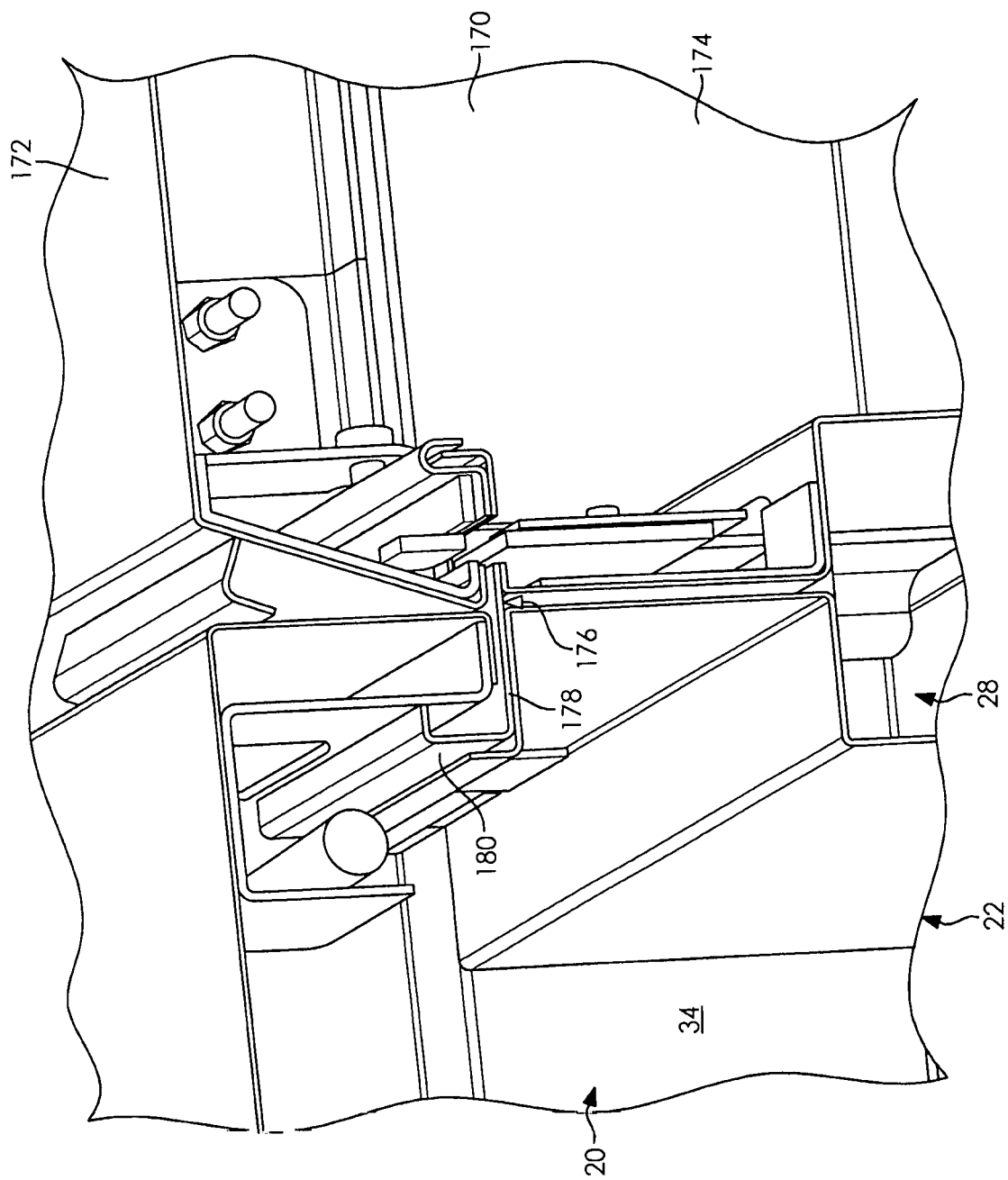
FIG. 10 schematically depicts one embodiment of a partial cross-section of the box and accessory box joining features.

An accessory box 170 may be selectively connected to the box 20 as shown in FIGS. 9 and 10. The accessory box 170 may be functionally and/or structurally similar to the box 20 in that it may have a selectively openable lid 172 and hollow interior portion 174 that can accommodate drawers, storage, etc. The accessory box 170 may be connected to the box 20 by locating it adjacent, such as in direct contact with, one side of the box 20.

A connector flange 176 may be secured to the lid 172 of the accessory box 170. The connector flange 176 may have a flat portion 178 that extends between the two boxes 20, 170. The flat portion 178 transitions to a C-shaped flange 180 on the box 20 side. The lid 36 of the box 20 may be closed in its traditional fashion on the flange 180. When the box lid 36 is locked, the flange 180, and thus the lid 172 of the accessory box 170, are prevented from movement.

The term box 20 and accessory box 170 are used to refer to structures that are designed to hold tools, equipment and a wide variety of related items. The boxes 20, 172 are depicted as having a certain length, width and depth providing them with a generally rectangular cross section. The boxes 20, 170, however, are not limited to the depicted shape or size.

In the depicted embodiments, the boxes 20, 170 may each have an upper area 182 and a lower area 184. The areas 182, 184 may be equal or unequal in the volume of the boxes 20, 170 they occupy. For example, in one embodiment, the lower area 184 occupies a larger volume than the upper area 182, but other arrangements are permissible.

In accordance with the provisions of the patent statutes, the present device and method has been described in what is considered to represent its preferred embodiments. However, it should be noted that the device and method can be practiced otherwise than as specifically illustrated and described without departing from its spirit or scope.

What is claimed is:

1. A locking structure of a box, the box comprising a first compartment and a second compartment, the locking structure comprising:
    a horizontally oriented locking bar having a first end portion and a body portion, wherein the first end portion has an aperture therethrough and the body portion has a plurality of locking teeth extending therefrom configured to selectively interlock with slots on said first compartment;
    a vertically oriented locking bar having a first end portion and a body portion configured to selectively prevent movement of said second compartment, wherein the first end portion has an aperture therethrough;
    a lock housing having a lock behind fixed first and second bars defining a passage between them;
    wherein said first end portion of said vertically oriented locking bar is selectively located between said fixed first and second bars and said lock;
    wherein said first end portion of said horizontally oriented bar is selectively located through said passage between said fixed first and second bars, through said aperture of said vertically oriented bar and into said lock.

2. The locking structure of claim 1, wherein said plurality of locking teeth are unitary with said horizontally locking oriented bar, and are parallel and coplanar with said horizontally locking oriented bar, but the locking teeth are vertically offset from said horizontally locking oriented bar.

3. The locking structure of claim 2, wherein said plurality of locking teeth selectively engage with slots in a lid to lock the lid and the teeth together.

4. The locking structure of claim 2, wherein a handle is attached to the horizontally oriented locking bar opposite said plurality of locking teeth, said handle located in an operator's box.

5. The locking structure of claim 1, wherein the horizontally oriented locking bar is located above an upper plate of an operator's box, the box comprising a lever housing, a back plate, the upper plate and a lower plate.

6. The locking structure of claim 1, wherein one end of a lever is located in an operator's box and the other end of the lever extends through a lever housing where it is connected to the body portion of the vertically oriented locking bar.

7. The locking structure of claim 1, wherein said body portion of said vertically oriented locking bar has slots for selectively receiving locking pins therein.

8. The locking structure of claim 1, wherein said fixed first and second bars are planar but vertically offset from one another wherein said fixed first and second bars are identical to one another.

9. The locking structure of claim 1, wherein one end of each of said fixed first and second bars are located in a bar mount oriented transverse the fixed first and second bars and the other end of each of said fixed first and second bars are located in a plate parallel the bar mount.

10. The locking structure of claim 1, wherein said lock has a shackle oriented parallel but nonplanar with said fixed first and second bars.

11. The locking structure of claim 1, wherein said horizontally oriented locking bar can be axially slid into and out of engagement with the lock and said vertically oriented locking bar, and said vertically oriented locking bar can be radially slid into and out of engagement with the horizontally oriented locking bar and the lock housing.

* * * * *